Jan. 22, 1952  M. STEGENA  2,583,237
CORSAGE FRAME
Filed Jan. 14, 1949
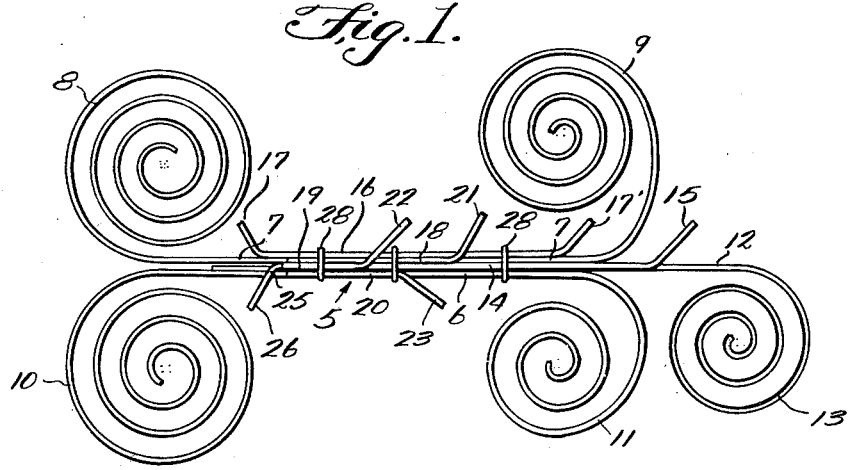
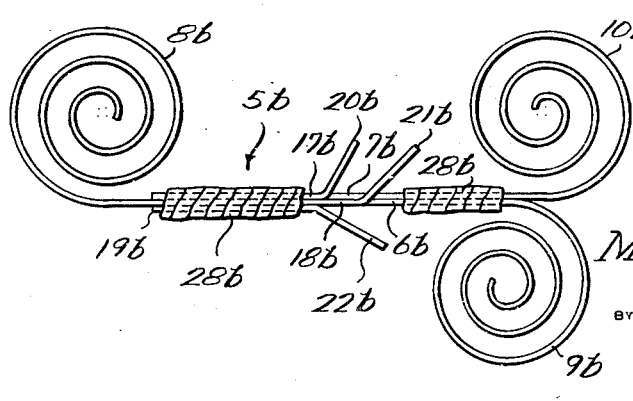
INVENTOR.
Michael Stegena,
BY Victor J. Evans & Co.
ATTORNEYS Patented Jan. 22, 1952

2,583,237

UNITED STATES PATENT OFFICE 2,583,237

CORSAGE FRAME

Michael Stegena, Steubenville, Ohio

Application January 14, 1949, Serial No. 70,841

2 Claims. (Cl. 41—12)

The present invention relates to improvements in flower holders and in particular to a corsage frame.

One object of the invention resides in the provision of a corsage frame having a series of flower holding members which are arranged in a definite pattern such that when flowers are applied by an unskilled operator the corsage will assume the appearance of one produced by a professional florist.

Another object is to provide a corsage frame which is provided with scroll portions to enhance the appearance of the corsage and form flat supporting surfaces of increased area to prevent the stem holding portion of the frame from becoming disarranged when in place on the wearer. Thus, the corsage will remain in its proper position.

Another object is to provide a corsage frame which is formed of florists cotton or chenille covered wire in which a plurality of fibers are anchored between two or more twisted wires. The fibers being of various colors to add to the appearance of the corsage, and the wire being of a type which is readily bendable to assume numerous positions and facilitate the attachment of flowers thereto.

Another object is to provide a corsage frame which can be easily constructed from a series of pre-set fiber covered wires and sold to the florist to assist in the correct positioning of the flowers when making up a corsage, and which can be conveniently packed for shipping.

Other objects and advantages of the invention will become apparent during the course of the following description of the accompanying drawing wherein:

Figure 1 is a plan view of one embodiment of the invention, showing the manner in which a series of flower holding prongs are arranged on the frame to correctly position flowers when they are applied to the frame and Figure 2 is a plan view of a modified form of the invention showing a flower holder for use in the making of small corsages of certain types.

In the drawings, and more in detail, attention is directed to Figure 1, wherein there is shown for the purpose of convenience of illustration, a corsage frame generally designated 5 formed of florists' cotton or chenille covered wire of various colors. The frame 5 includes a pair of longitudinal wire frame members 6 and 7 having their ends helically curved to provide scroll portions 8—9 and 10—11 having their spiral convolutions lying in the same plane. Similarly, there is provided a longitudinal frame wire 12 having a spiral scroll 13 at one end with its convolutions lying in the same plane.

The frame wires 6, 7 and 12 are adapted to be arranged in a bundle so that the scrolls 8, 9, 10 and 11 and 13 likewise lie in the same plane, and thereby provide a support of increased area for engaging the garment of the corsage wearer and preventing turning or twisting of the corsage after it has been fastened in place.

Also arranged in the bundle of frame wires 6, 7 and 12 is a series of flower holding wires which are arranged to define a certain pattern and assist in the proper positioning of the flowers to give the effect of a skillfully constructed corsage. As shown in Figure 1, a flower holding wire 14 is arranged with its longitudinal portion in the bundle of frame wires 6, 7 and 12, and the outer end of said wire is bent angularly as at 15 to provide a flower receiving and supporting prong capable of being inserted in the calyx of a rose or other flower used in the corsage.

In a similar manner, a longitudinal flower holding wire 16 is arranged with the bundle of wires 6, 7, 12 and 14 and said wire has both of its ends 17 and 17' angularly bent to extend in opposite directions and provide a flower holding prong extending in the same direction as the prong 15 and one extending at an angle in the opposite direction.

Also included in the corsage frame 5 is a series of short flower holding wires 18, 19 and 20 which have their ends angularly bent as at 21, 22 and 23 respectively to extend in the same general direction outwardly away from the axis of the frame 5 in slightly different angular directions.

A flower supporting wire 25 is also included in the corsage frame and has its end 26 extending outwardly at an angle and in the same general direction as the prong or flower holder 17.

After all of the wire frame members and flower holding wires are assembled in the order shown in Figure 1 to form a bundle, fastening means such as staple or clips 28 are employed to fasten the wires in a compact bundle mass. If desired, various types of tape may be employed to wrap the frame and flower holding wires to hold the same in their pre-arranged positions with the flower holding prongs in the definite order or pattern as shown. It is to be noted, that the position of the flower holding prongs 15, 17', 21 and 22 are arranged to extend in the same general angular direction on one side of the frame 5, while the other side is provided with a single flower holding prong 23 extending in the same angular direction as the prongs 15, 17', 21 and 22, but oppositely positioned. Also, it is to be noted that one end of the frame 5 is provided on each side with flower holding wire prongs 17 and 26 extending at an angle to the axis of the frame 5, but in opposite directions one to the other and to the flower holding prongs 15, 17', 21, 22 and 23.

In use, the wire prongs 15, 17, 17', 21, 22, 23 and 26 are inserted in the calyx of the flower from which the corsage is being made such as roses or the like, and the shortened stems are arranged parallel with the frame 5 where they are secured by wrapping the frame and stem with floral tape of any desired or selected color. In addition, the usual foliage or leafage is wrapped with the stems to further enhance the appearance of the corsage. The foliage will thus be positioned in the spaces between the flowers impaled on the prongs, and the general order and arrangement of the corsage will have the appearance of one constructed and assembled by a floral artist.

When the corsage is to be worn on the garment of the purchaser, the flat helical frame scroll portions will lie against the garment in facial contact therewith, and prevent the frame 5 from being twisted or distorted and causing the flowers to droop downwardly. Thus, the flowers on the corsage will be held in an upright position with respect to the frame 5 as well as with respect to the surface of the garment upon which the corsage is worn.

In the modified form of the invention illustrated in Figure 2, the corsage holder is intended for use in making small corsages for children or for various types of expensive flowers. As shown, the frame generally designated 5b includes a frame wire 6b likewise formed of florists' cotton or chenille covered wire of a pre-selected color, and the ends of said frame wire are coiled in opposite directions as at 8b and 9b to form oppositely extending scrolls. The convolutions of the scrolls lie in the same plane as described in the previous forms of the invention. Arranged alongside the frame wire 6b is a frame wire 7b having one end coiled to provide a scroll 10b opposite the scroll 9b.

A series of flower holding wires 17b, 18b and 19b are arranged beside the frame wires 6b and 7b, and one end of each of said wires is bent to extend angularly to the axis of the frame wires to form flower holding prongs 20b, 21b and 22b respectively. The prongs 20b and 21b extend in the same angular direction, while the prong 22b extends in an opposite angular direction.

The flower holding and frame wires are wrapped with tape 28b to hold the same in a predetermined position to define a pattern arrangement for correctly positioning flowers impaled on said prongs. As pointed out in connection with the form of the invention shown in Figure 1, the stems of the flowers are secured to the frame 5b by means of floral tape and the prongs 20b, 21b and 22b are inserted in the calyx of the flower. Thus, the flowers will be properly positioned in a definite pattern to give the appearance of a corsage made by a floral artist.

The frame and corsage (not shown) 5b is adapted to be fastened to the garment of the wearer by the usual fastening pins and the scrolls 8b, 9b and 10b engage the surface of the garment to hold the corsage in its correct position. Hence, the flowers will be prevented from sagging or becoming out of order and will be held at a definite angle relative to the axis of the frame 5b.

It is to be understood that the forms of the invention herewith shown and described are to be taken as preferred embodiments thereof and that various changes in the shape, size and arrangement of parts may be resorted to without departing from the spirit of the invention or the scope of the subjoined claims.

I claim:

1. In a corsage holder, a series of wire frame members having coiled ends to form flat helical scrolls with their convolutions in the same plane, a series of flower holding wires having straight portions adapted to be arranged in a bundle with said wire frame members so that said scrolls will lie in the same plane, flower holding means on the ends of said flower holding wires and means for holding said wires together, said flower holding means including angularly directed prongs formed on the ends of said flower holding wires to receive the calyx of flowers secured to said holder.

2. As a new article of manufacture, a corsage holder, said corsage holder comprising a pair of flexible wire frame members each having its ends helically curved to provide scroll portions, said scroll portions being arranged in the same plane, a series of wires arranged in side-by-side relation with respect to said wire frame members, the outer ends of said wires being arranged angularly with respect to the main portion thereof to provide prongs for piercing the calyx of a flower, said wires being of varying lengths and the prongs thereon lying in different planes, and a plurality of clips for securing said wires to said frame members.

MICHAEL STEGENA.

REFERENCES CITED

The following references are of record in the file of this patent:

UNITED STATES PATENTS

| Number | Name | Date |
|---|---|---|
| 160,247 | Warren | Feb. 23, 1875 |
| 1,769,198 | Albany | July 1, 1930 |
| 1,845,154 | Jewett | Feb. 16, 1932 |
| 2,173,011 | De Meester | Sept. 12, 1939 |